US011379201B2

United States Patent
Zhang et al.

(10) Patent No.: US 11,379,201 B2
(45) Date of Patent: Jul. 5, 2022

(54) WRAPPING METHOD, REGISTRATION METHOD, DEVICE, AND RENDERING APPARATUS

(71) Applicant: Baidu Online Network Technology (Beijing) Co., Ltd., Beijing (CN)

(72) Inventors: Yangyang Zhang, Beijing (CN); Longlong Li, Beijing (CN); Jingzhi Chen, Beijing (CN); Jianchi He, Beijing (CN); Shibo Zou, Beijing (CN)

(73) Assignees: Baidu Online Network Technology (Beijing) Co., Ltd., Beijing (CN); Shanghai Xiaodu Technology Co. Ltd., Shanghai (CN)

( * ) Notice: Subject to any disclaimer, the term of this patent is extended or adjusted under 35 U.S.C. 154(b) by 34 days.

(21) Appl. No.: 16/879,986

(22) Filed: May 21, 2020

(65) Prior Publication Data

US 2021/0117170 A1 Apr. 22, 2021

(30) Foreign Application Priority Data

Oct. 21, 2019 (CN) .......................... 201911001948.8

(51) Int. Cl.
*G06F 9/45* (2006.01)
*G06F 8/41* (2018.01)
(Continued)

(52) U.S. Cl.
CPC .......... *G06F 8/447* (2013.01); *G06F 9/44505* (2013.01); *G06F 9/45558* (2013.01)

(58) Field of Classification Search
CPC .. G06F 9/45538; G06F 9/44505; G06F 8/447; G06F 9/4558
(Continued)

(56) References Cited

U.S. PATENT DOCUMENTS 6,275,983 B1 * 8/2001 Orton .................... G06F 9/4484
717/138
6,957,439 B1 * 10/2005 Lewallen .................. G06F 8/51
717/136
(Continued)

FOREIGN PATENT DOCUMENTS

| JP | 2013109675 | 6/2013 |
| JP | 2016514880 | 5/2016 |

OTHER PUBLICATIONS

Title: Tinyreef: a register-based virtual machine for wireless sensor networks, author: IL Marques, et al, published on 2009.*
(Continued)

*Primary Examiner* — Chameli Das
(74) *Attorney, Agent, or Firm* — SmithAmundsen LLC

(57) ABSTRACT

A wrapping method and device, a registration method and device, and a rendering apparatus are provided, which are related to a field of computer display technology. The specific implementation includes: receiving a creation instruction from a registry component, wherein the creation instruction includes an identification of a wrapper object to be registered, in a target code; and creating a corresponding wrapper object in the wrapper module, according to the identification of the wrapper object to be registered in the target code. In embodiments of the present application, a wrapper object may be quickly created in a wrapper module according to an identification of a wrapper object to be registered in a target code, which is beneficial to a reuse of a wrapper object, thereby improving code execution efficiency.

4 Claims, 11 Drawing Sheets

(51) Int. Cl.
  *G06F 9/445* (2018.01)
  *G06F 9/455* (2018.01)
(58) Field of Classification Search
  USPC .......................................................... 717/140
  See application file for complete search history.

(56) References Cited

U.S. PATENT DOCUMENTS

| | | | | |
|---|---|---|---|---|
| 6,985,912 | B2* | 1/2006 | Mullins | G06F 16/9574 |
| 7,318,229 | B1* | 1/2008 | Connor | G06F 9/548 |
| | | | | 719/330 |
| 2004/0172640 | A1 | 9/2004 | Luo et al. | |
| 2004/0205697 | A1* | 10/2004 | Hylands | G06F 9/44521 |
| | | | | 719/329 |
| 2005/0039186 | A1* | 2/2005 | Borkan | G06F 11/3476 |
| | | | | 719/310 |
| 2005/0039187 | A1* | 2/2005 | Avakian | G06F 11/3476 |
| | | | | 719/310 |
| 2017/0316539 | A1* | 11/2017 | Du | G06T 1/00 |
| 2020/0210216 | A1* | 7/2020 | Boilen | G06F 9/45504 |

OTHER PUBLICATIONS

Title: A Virtual Machine for Distributed Agent-oriented Programming. Author: B Zhou et al, published on 2008.*
Title: Online Upgrade of Object-Oriented Middleware. Author: AV Zarras; Published on 2004.*
Title: Contract-checking wrappers for C++ classes ; author: SH Edwards, published on 2004.*
Office Action from the Japanese Patent Office for Application No. 2020-087902 dated May 31, 2021 (4 pages).
Amano, Noriki, "Realization of pseudo adaptive methods, electronic information and communication science," (Machine Translation) Dec. 13, 2005 (10 pages).
Naito, Kenichi, "Because the Web is now in its heyday, we should learn JavaScript from the basic knowledge we want to remember," (Machine Translation) Apr. 24, 2016 (13 pages).

* cited by examiner

WRAPPING METHOD, REGISTRATION METHOD, DEVICE, AND RENDERING APPARATUS

CROSS-REFERENCE TO RELATED APPLICATIONS

This application claims the benefit of Chinese patent application No. 201911001948.8, entitled "Wrapping Method, Registration Method, Device, and Rendering Apparatus", filed with the Chinese Patent Office on Oct. 21, 2019, which is incorporated by reference herein in its entirety.

TECHNICAL FIELD

The present application relates to a field of computer technology, and in particular, to a field of computer display technology.

BACKGROUND

A rendering engine is mainly used to transform a resource file into a user-visible result. In related technologies, a resource file is compiled by a rendering engine on a device side, to achieve a rendering effect. However, a compilation process of a rendering engine requires massive calculations, resulting in many problems, such as a slow rendering speed.

SUMMARY

A wrapping method, applied to a wrapper module, is provided according to an embodiment of the present application. The wrapping method includes:
receiving a creation instruction from a registry component, wherein the creation instruction includes an identification of a wrapper object to be registered, in a target code; and
creating a corresponding wrapper object in the wrapper module, according to the identification of the wrapper object to be registered in the target code.

In an embodiment of the present application, according to an identification of a wrapper object to be registered in a target code, a wrapper object may be quickly created in a wrapper module, which is beneficial to realizing a reuse of a wrapper object, thereby improving code execution efficiency.

In an implementation, the wrapper module includes a creation interface, and the receiving the creation instruction from the registry component includes:
receiving the creation instruction from the registry component through the creation interface; and
the wrapping method further includes sending a mapping relation between a created wrapper object and a native code to the registry component through the creation interface.

In the foregoing implementation, after a mapping relation between a created wrapper object and a native code is returned to a registry component, the registry component may send the mapping relation to a virtual machine. The virtual machine controls the registry component, to create a wrapper object in a wrapper module, so that an execution code corresponding to the target code is acquired by a compilation, according to the mapping relation between the wrapper object and the native code in an operating system, which facilitates an improvement of compilation and execution efficiency.

In an implementation, the wrapper module further includes an invocation interface, and the wrapping method further includes:
receiving a call instruction from an invoking component through the invocation interface, wherein the call instruction includes an identification, a method name, and a parameter of a wrapper object to be executed; and
after finding out, from the wrapper module, a wrapper object corresponding to the identification of the wrapper object to be executed, invoking a method corresponding to the method name of the wrapper object to be executed, and loading the parameter of the wrapper object to be executed, to execute a native code corresponding to the wrapper object to be executed, in an operating system.

In the foregoing implementation, the invoking component may invoke a created wrapper object, so that an operating system executes a native code corresponding to the invoked wrapper object. A code compilation and execution may be separated, thereby improving code compilation and execution efficiency.

In an implementation, the wrapper module further includes a feedback interface, and the wrapping method further includes: sending feedback information to a virtual machine through the feedback interface, wherein the feedback information includes an execution result acquired by the wrapper module from the operating system.

In the foregoing implementation, the wrapper module feeds back information, such as an execution result of the operating system, to the execution engine through the virtual machine, so that the execution engine may continue to execute a subsequent execution code, in consideration of the feedback information.

In an implementation, the method further includes:
wrapping a native code in an operating system in advance, to acquire a wrapper object, and an identification and a method name corresponding to the acquired wrapper object.

In the foregoing implementation, a native code in an operating system is wrapped in advance, a rapid creation of a wrapper object may be realized subsequently, which is beneficial to a reuse of a wrapper object.

A registration method, applied to a registry component, is provided according to an embodiment of the present application. The registration method includes:
receiving a registration instruction from a virtual machine, wherein the registration instruction includes an identification of a wrapper object to be registered, in a target code; and
sending a creation instruction to the wrapper module, to create a corresponding wrapper object in the wrapper module according to the identification of the wrapper object in the creation instruction.

In an implementation, the receiving the registration instruction from the virtual machine includes receiving the registration instruction from the virtual machine through a registration interface of the registry component; and
the sending the creation instruction to the wrapper module includes sending the creation instruction to the wrapper module through a creation interface of the wrapper module.

In an implementation, the wrapper module includes the creation interface, and the registration method further includes:
receiving, from the wrapper module, a mapping relation between a created wrapper object and a native code through the creation interface; and
returning to the virtual machine the mapping relation between the created wrapper object and the native code through the registration interface, to acquire an execution code corresponding to the target code by performing a compilation at the virtual machine.

A wrapper device, applied to a wrapper module, is provided according to an embodiment of the present application. The wrapper device includes:

a first receiving unit, configured to receive a creation instruction from a registry component, wherein the creation instruction includes an identification of a wrapper object to be registered, in a target code; and a creation unit, configured to create a corresponding wrapper object in the wrapper module, according to the identification of the wrapper object to be registered in the target code.

In an implementation, the wrapper module includes a creation interface, and the first receiving unit is further configured to receive a creation instruction from a registry component through the creation interface; and the device further includes: a first sending unit, configured to send a mapping relation between a created wrapper object and a native code to the registry component through the creation interface.

In an implementation, the wrapper module further includes an invocation interface, and the device further includes:

a second receiving unit, configured to receive a call instruction from an invoking component through the invocation interface, wherein the call instruction includes an identification, a method name, and a parameter of a wrapper object to be executed; and an invocation unit, configured to invoke, after finding out, from the wrapper module, a wrapper object corresponding to the identification of the wrapper object to be executed, a method corresponding to the method name of the wrapper object to be executed, and to load the parameter of the wrapper object to be executed, to execute a native code corresponding to the wrapper object to be executed, in an operating system.

In an implementation, the wrapper module further includes a feedback interface, and the device further includes:

a second sending unit, configured to send feedback information to a virtual machine through the feedback interface, wherein the feedback information includes an execution result acquired by the wrapper module from the operating system.

In an implementation, the device further includes:

a pre-wrapping unit, configured to wrap a native code in an operating system in advance, to acquire a wrapper object, and an identification and a method name corresponding to the acquired wrapper object.

A registration device, applied to a registry component, is provided according to an embodiment of the present application. The device includes:

a third receiving unit, configured to receive a registration instruction from a virtual machine, wherein the registration instruction includes an identification of a wrapper object to be registered, in a target code; and a third sending unit, configured to send a creation instruction to a wrapper module, to create a corresponding wrapper object in the wrapper module according to the identification of the wrapper object in the creation instruction.

In an implementation, the third receiving unit is further configured to receive the registration instruction from the virtual machine through a registration interface of the registry component; and the third sending unit is further configured to send the creation instruction to the wrapper module through a creation interface of the wrapper module.

In an implementation, the device further includes:

a fourth receiving unit, configured to receive, from the wrapper module, a mapping relation between a created wrapper object and a native code through the creation interface; and a fourth sending unit, configured to return to the virtual machine the mapping relation between the created wrapper object and the native code through the registration interface, to acquire an execution code corresponding to the target code by performing a compilation at the virtual machine.

A rendering apparatus is provided according to an embodiment of the present application. The apparatus includes:

an execution engine, configured to send an initialization instruction to a virtual machine, wherein the initialization instruction is acquired by loading a target code through the execution engine, and to receive an execution code corresponding to the target code from the virtual machine;

the virtual machine, configured to receive the initialization instruction from the execution engine, wherein the initialization instruction is acquired by loading the target code through the execution engine; to send a registration instruction to a registry component according to the initialization instruction, wherein the registration instruction includes an identification of a wrapper object to be registered, in the target code; to acquire the execution code corresponding to the target code by a compilation, according to a mapping relation between a wrapper object and a native code of an operating system; and to send the execution code to the execution engine for execution; and a registry component, configured to execute the registration method according to an embodiment of the present application.

In an implementation, the execution engine is further configured to send an execution instruction to the virtual machine, wherein the execution instruction is acquired by executing the execution code through the execution engine; and the rendering apparatus further includes:

an invoking component, configured to receive a call instruction from the virtual machine, to invoke a wrapper object in a wrapper module; and the wrapper module, configured to execute the wrapping method according to an embodiment of the present application.

In an implementation, the rendering apparatus further includes: a bridge, configured to send the initialization instruction from the execution engine to the virtual machine, and to send the execution code from the virtual machine to the execution engine.

An electronic apparatus is provided according to an embodiment of the present application, which includes:

at least one processor; and a memory communicated with the at least one processor; wherein instructions executable by the at least one processor are stored in the memory, and the instructions are executed by the at least one processor, to enable the at least one processor to implement the wrapping method or the registration method provided by any one of the embodiments of the present application.

A non-transitory computer-readable storage medium, in which computer instructions are stored, is provided according to an embodiment of the present application, wherein the computer instructions are configured to enable a computer to implement the wrapping method or the registration method provided by any one of the embodiments of the present application.

An above embodiment in the application has the following advantages or beneficial effects: in an embodiment of the present application, according to an identification of a wrapper object to be registered in a target code, a wrapper object may be quickly created in a wrapper module, which is beneficial to realizing a reuse of a wrapper object, thereby improving code execution efficiency.

Other effects of the foregoing alternative implementations will be described below with reference to specific embodiments.

BRIEF DESCRIPTION OF THE DRAWINGS

The drawings are illustrated only for better understanding the present application, rather than being restrictive to the present application, in which:

FIGS. 2A and 2B are schematic diagrams showing codes in a wrapping method according to an embodiment of the present application;

DETAILED DESCRIPTION OF EMBODIMENTS

With reference to the accompanying drawings, exemplary embodiments of the present application are described below, which include various details of the embodiments of the present application to facilitate understanding and should be considered as merely exemplary. Therefore, those of ordinary skilled in the art should recognize that various changes and modifications can be made to the embodiments described herein, without departing from the scope and spirit of the present application. Also, for clarity and conciseness, descriptions for public knowledge of functions and structures are omitted in the following descriptions.

Figure 1:
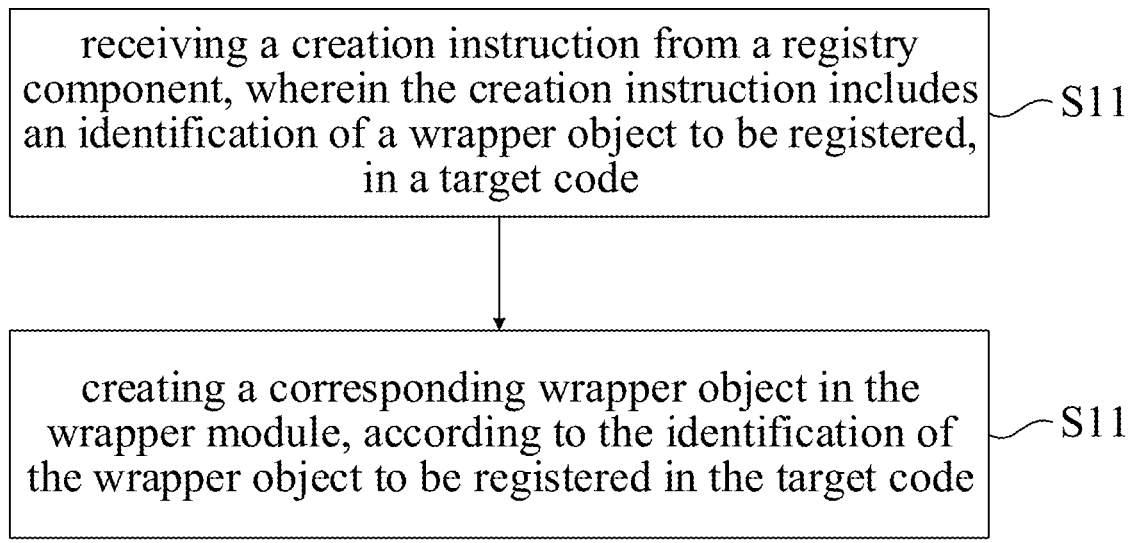
FIG. 1 is a schematic flowchart showing a wrapping method according to an embodiment of the present application.

FIG. 1 is a schematic flowchart showing a wrapping method according to an embodiment of the present application. As shown in FIG. 1, the wrapping method may be applied to a wrapper module, and may include:

S11, receiving a creation instruction from a registry component, wherein the creation instruction includes an identification of a wrapper object to be registered, in a target code; and S12, creating a corresponding wrapper object in the wrapper module, according to the identification of the wrapper object to be registered in the target code.

In an embodiment of the present application, a wrapper object may be acquired by wrapping a native code in an operating system in advance. Each wrapper object has a corresponding identification and a method name. There are many types of wrapper objects, including but not limited to: an image component (Image), a view component (View), a text component (Text), an image and view component (ImageView), a pager component (Pager), a page management component (PageManager), a container component (Container), a scroll view component (ScrollView), a frame component (Frame), a list component (List), a network component (Network), and the like. In an implementation, the wrapping method further includes wrapping a native code in an operating system in advance, to acquire identifications and method names corresponding to respective wrapper objects. A rapid creation of a wrapper object may be realized subsequently, which is beneficial to a reuse of a wrapper object.

Figures 2A, 2B:
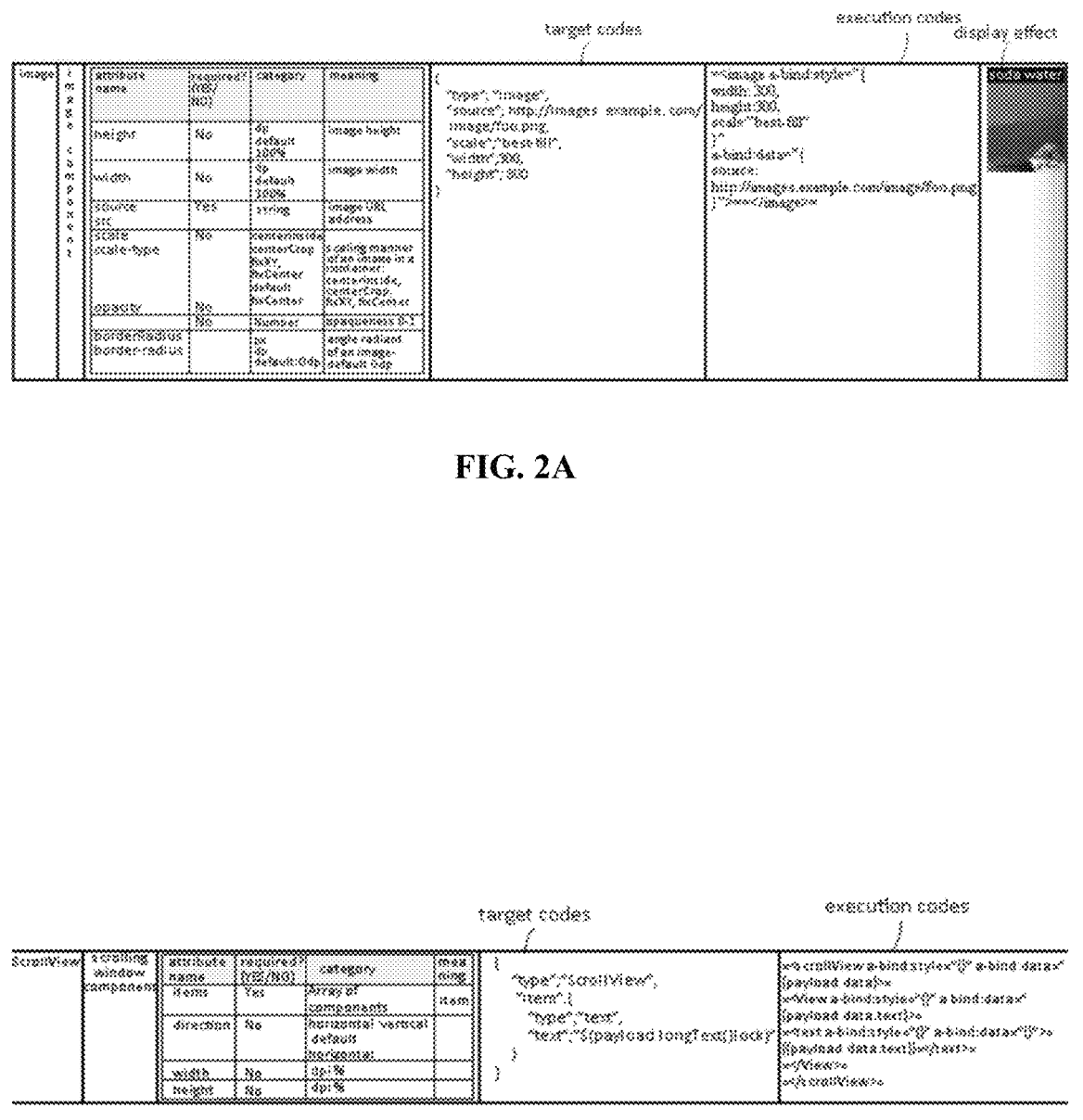

In an example, a target code may include a code required to implement a certain function, such as a rendering effect. For example, referring to FIG. 2A, a target code may include a code required to render an image component (Image, also referred to as a picture component). A code may include attributes, such as a type of the image component "type", an image address "source", a scale mode "scale", a width "width", a height "height". For another example, referring to FIG. 2B, a target code may include a code required to render a scroll view component (ScrollView). A code may include attributes, such as a type of the scroll view component "type", a component "item", and may also include attributes, such as a direction "direction", a width "width", and a height "height".

Figure 3:
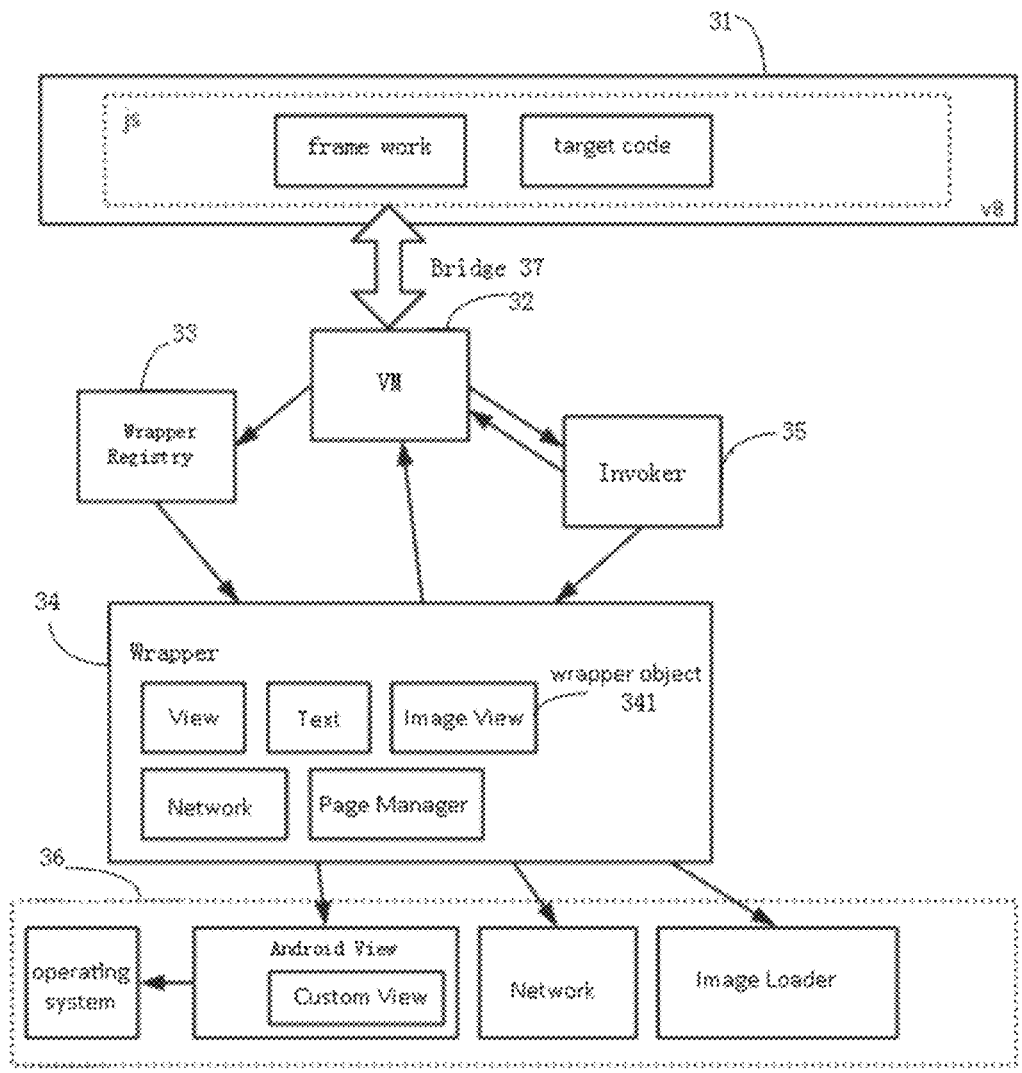
FIG. 3 is a schematic diagram showing an application example of a wrapping method according to an embodiment of the present application.

In an example, a target code, executed conveniently by an apparatus, may be generated at a server by using a rendering template. After receiving target codes, an apparatus may run these codes and display them on a screen. Referring to FIG. 3, after receiving a target code, such as a product code, during a process of loading the target code, an execution engine 31 may send an initialization instruction to a virtual machine 32 (for example, an Atom VM).

In an implementation, an initialization instruction includes an identification of a wrapper object to be initialized. In another implementation, in addition to a wrapper object identification of a wrapper object, an initialization instruction may further include a method name and/or a parameter of a wrapper object. The number and types of wrapper objects to be initialized in different target codes may be different. A wrapper object may include one or more method names, where each method name may correspond to a function name related to an interaction in an operating system. For example, a wrapper object of a picture corresponds to an Image (an image component) in an Android system, and a method for setting an image resource corresponds to a setImage method in an Image operating system. A parameter may include a resource required to execute a method corresponding to a method name, such as a unified resource locator (URL) address of an image.

A virtual machine may send to a registry component a registration instruction including an identification of a wrapper object to be registered, according to the initialization instruction. After receiving the registration instruction, the registry component may send to a wrapper module a creation instruction including the identification of a wrapper object to be registered. After receiving the creation instruction, the wrapper module may create a wrapper object corresponding to the identification in the wrapper module.

In an implementation, in addition to a wrapper object identification of a wrapper object, a registration instruction may further include a method name and/or a parameter of a wrapper object. In addition to a wrapper object identification of a wrapper object, a creation instruction may further include a method name and/or a parameter of a wrapper object In addition, the content and format of an initialization instruction, a registration instruction, and a creation instruction may be the same or different. That is, a virtual machine may modify the content and format of a received initialization instruction, and send it to a registry component, or it may directly forward the initialization instruction as a registration instruction to the registry component without any modification. After receiving a registration instruction from a virtual machine, a registry component may modify the content and format of the received registration instruction, and send it to a wrapper module, or it may directly forward the registration instruction as a creation instruction to the wrapper module without any modification.

In an example, referring to FIG. 3, after receiving an initialization instruction, a virtual machine 32 may send a registration instruction to a registry component 33, such as a wrapper registry component (Wrapper Registry). After receiving the registration instruction, the registry component 33 may send a creation instruction to a wrapper module (Wrapper) 34, where the creation instruction includes an identification, a method name, and a parameter of a wrapper object to be registered in a target code. The wrapper module 34 may create a wrapper object 341 required for executing the target code, according to the creation instruction. There are many types of wrapper objects, including but not limited to: an image component (Image), a view component (View), a text component (Text), an image and view component (ImageView), a pager component (Pager), and a page management component (PageManager), a container component (Container), a scroll view component (ScrollView), a frame component (Frame), a list component (List), a network component (Network), and the like.

In an example, in a case that a wrapper object corresponding to a part of a target code is an image component (Image), the identification of the wrapper object may be "Image", the method name may be setImage, and the parameter may include width, length, URL address, and the like.

During a creation of a wrapper object in a wrapper module, a mapping relation between the wrapper object and a native code in an operating system may be acquired. After a wrapper object is registered and created, a wrapper module may return a mapping relation to a registry component. The registry component returns the mapping relation to a virtual machine, to acquire an execution code corresponding to a target code by performing a compilation at the virtual machine. The virtual machine may then send the execution code to an execution engine for execution.

In an embodiment of the present application, according to an identification of a wrapper object to be registered in a target code, a wrapper object may be quickly created in a wrapper module, which is beneficial to realizing a reuse of a wrapper object, thereby improving code execution efficiency. In addition, a virtual machine controls a registry component, to create a wrapper object in a wrapper module, so that an execution code corresponding to a target code is acquired by a compilation, according to a mapping relation between a wrapper object and a native code in an operating system. In this way, a code mapping and invocation may be separated, and multiple wrapper objects may be invoked continuously, which is beneficial to realizing a reuse of a wrapper object, and to improve code compilation and execution efficiency.

Figure 4:
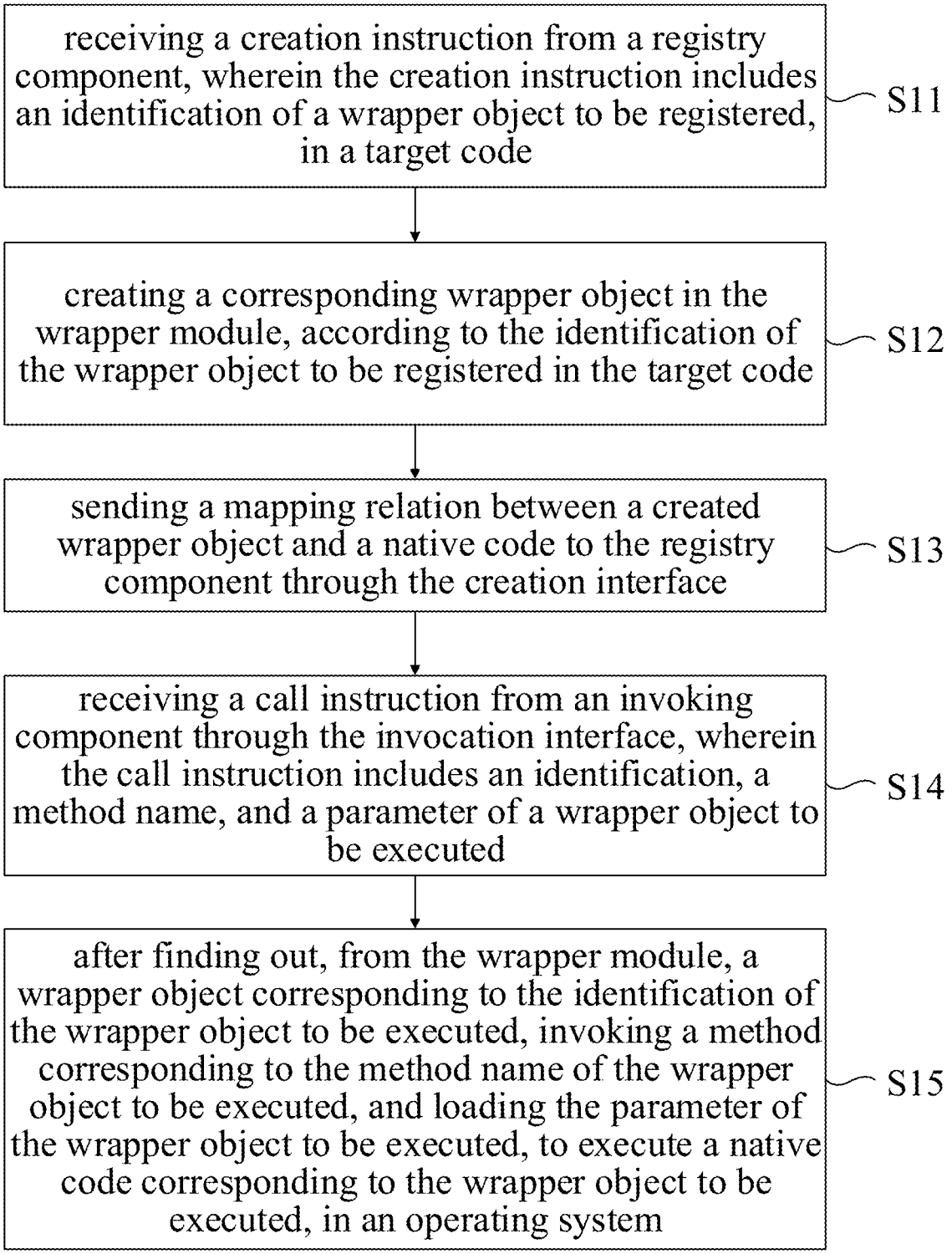
FIG. 4 is a schematic flowchart showing a wrapping method according to an embodiment of the present application.

In an implementation, as shown in FIG. 4, the wrapper module includes a creation interface, and S11 may include: receiving the creation instruction from a registry component through the creation interface.

The method further includes: S13, sending a mapping relation between a created wrapper object and a native code to the registry component through the creation interface.

In an implementation, as shown in FIG. 4, the wrapper module further includes an invocation interface, and the method further includes:

S14, receiving a call instruction from an invoking component through the invocation interface, wherein the call instruction includes an identification, a method name, and a parameter of a wrapper object to be executed; and S15, after finding out, from the wrapper module, a wrapper object corresponding to the identification of the wrapper object to be executed, invoking a method corresponding to the method name of the wrapper object to be executed, and loading the parameter of the wrapper object to be executed, to execute a native code corresponding to the wrapper object to be executed, in an operating system.

In an example, when executing a received execution code, an execution engine may send to a virtual machine an execution instruction including an identification, a method name, and a parameter of a wrapper object to be executed. After receiving the execution instruction from the execution engine, the virtual machine may send a call instruction to an invoking component through an invocation interface, where the call instruction includes the identification, the method name, and the parameter of the wrapper object to be executed. The invoking component may send to a wrapper module a call instruction including the identification, the method name, and the parameter of the wrapper object to be executed. In an embodiment of the present application, the content and format of an execution instruction received by a virtual machine, and of a call instruction sent by the virtual machine may be the same or different. That is, a virtual machine may modify the content and format of a received execution instruction, and send it to a invoking component, or it may directly forward the execution instruction as a call instruction to the invoking component without any modification. The content and format of a call instruction sent by a virtual machine to an invoking component, and of a call instruction sent by an invoking component to a wrapper module may be the same or different. That is, an invoking component may modify the content and format of a received call instruction, and send it to an invoking component, or it may directly forward the call instruction to the wrapper module without any modification.

In an embodiment of the present application, there may be one or more wrapper objects required for executing a target code. In a case that multiple wrapper objects are required to execute a target code, a registration process and an invoking process may be performed serially or parallelly. Referring to FIG. 3, after all wrapper objects are created by a registry component, serially, a virtual machine 32 may enable an invoking component, such as an invoker 35 to invoke the respective wrapper objects. Alternatively, during a process of creating respective wrapper objects by a registry component, the virtual machine 32 may parallelly enable an invoking component to invoke a created wrapper object.

In an implementation, an invoking component is an invoker. A virtual machine controls the invoker, to invoke respective wrapper objects in a wrapper module by using identifications, method names, and parameters of the wrapper objects, so that native codes corresponding to respective wrapper objects are executed in an operating system. In this way, a code invocation and mapping may be separated, and multiple wrapper objects may be invoked continuously, which is beneficial to improving code execution efficiency After receiving a call instruction, an invoker may find out, from a wrapper module, a wrapper object corresponding to an identification "Image" of the wrapper object to be executed, such as a certain image component. Then, a method corresponding to the method name of the image component is invoked, and parameters of the image component, such as a length, a width, and an image in the URL address of the image component are loaded. A native code corresponding to the image component to be executed is executed in an operating system, to display a rendering effect of the image component on a screen.

In a case that an execution code includes multiple wrapper objects to be executed, an execution engine may send multiple execution instructions to a virtual machine in a logical order in the execution code. The virtual machine sends multiple call instructions to an invoker, to invoke these wrapper objects in sequence. For example, wrapper objects to be executed include an image component, a scroll view component, and a list component. An execution engine may control an invocation sequence of these components according to a logical order of an execution code, where the invocation sequence is displaying the image component firstly, then the scroll view component, and at last the list component. The execution engine may sequentially invoke the image component, the scroll view component, and the list component according to the order through the virtual machine and the invoker.

In an implementation, the wrapper module further includes a feedback interface. The wrapping method further includes: sending feedback information to a virtual machine through the feedback interface, wherein the feedback information includes an execution result acquired by the wrapper module from the operating system.

After acquiring an execution result of a native code corresponding to a wrapper object from an operating system, a wrapper module may send feedback information including the execution result to a virtual machine. In a case that a certain change occurs in an operating system, such as a low system power, a wrapper module may further send it to a virtual machine via feedback information. Then, the virtual machine may send the feedback information to an execution engine. The execution engine may continue to execute a subsequent execution code, in consideration of the feedback information. For example, after receiving low system power feedback information, the execution engine will feed back the low system power information to a user, after an execution of a current code.

Figure 5:
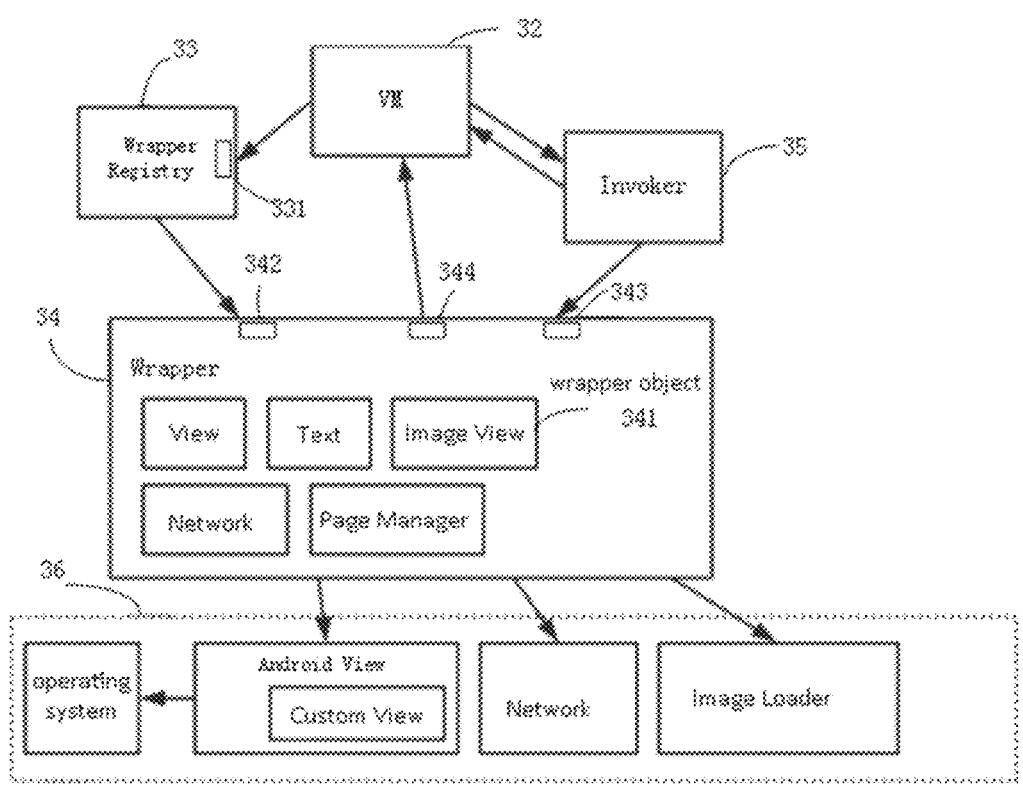
FIG. 5 is a schematic diagram showing a wrapper interface of a wrapper module according to an embodiment of the present application.

In an implementation, as shown in FIG. 5, after a native code in an operating system of an apparatus is wrapped in advance, an identification and a method name corresponding to a wrapper object may be acquired. For example, via a wrapper class, components and functions of a terminal are wrapped, and an interface suitable for an upper invocation is provided, which facilitates a management of a wrapper object of the terminal. A wrapper object may include an internal implementation and a third-party developer extension. Through a wrapper registry component (wrapper registry) 33, various types of wrapper objects may be registered to an upper layer, so that an execution engine recognizes components included in a specific wrapper object and methods in the wrapper object. A wrapper registry component (wrapper registry) also provides an interface for creating various types of wrapper objects, so that various wrapper objects 341 may be created in a wrapper module 34. After a wrapper object is created, an execution engine 31 may perform an operation on the wrapper object through a virtual machine 32 and an invoker 35, to invoke a method of the wrapper object 341.

Figure 10:
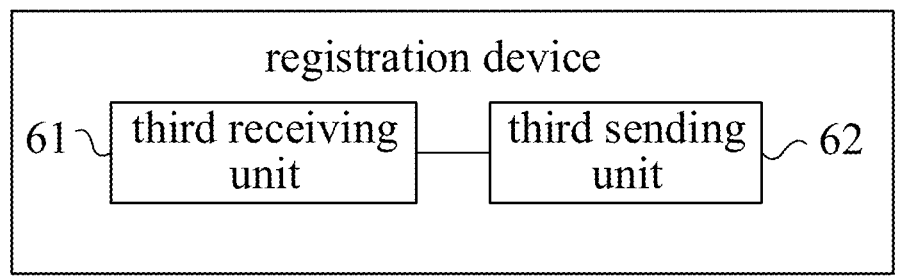
FIG. 10 is a structural block diagram showing a registration device according to an embodiment of the present application.

All wrapper objects of the above operating system constitute a wrapper object pool. For different target codes, different wrapper object may need to be created. A dynamic module including one or more wrapper objects, which is created according to a target code, may be referred to as a wrapper module 34. As shown in FIG. 10, a wrapper module 34 may provide multiple Application Programming Interfaces (APIs), such as a creation interface 342, an invocation interface 343, and a feedback interface 344. An API provided by a wrapper registry component 33 is a registration interface 331. The wrapper registry component 33 may receive a registration instruction from a virtual machine through the registration interface 331, where the registration instruction may include an identification, a method name, and a parameter of a wrapper object to be registered in a target code (a registration instruction may include only an identification of a wrapper object, or only an identification and a method name of a wrapper object, or only an identification and a parameter of a wrapper object). The wrapper registry component 33 may send a create instruction to the wrapper module 34 through the create interface 342, where the create instruction includes an identification, a method name, and a parameter of a wrapper object to be registered in a target code (a create instruction may also include only an identification of a wrapper object, or only an identification and a method name of a wrapper object, or only an identification and a parameter of a wrapper object). According to identifications, method names, and parameters of respective wrapper objects to be registered in a target code, the wrapper module 34 creates corresponding wrapper objects 341 in the wrapper module 34. After a registration is completed, the wrapper module 34 may return a mapping relation between a created wrapper object and a native code to the wrapper registry component 33 through the creation interface 342. The wrapper registry component 33 returns the mapping relation between the created wrapper object and the native code to the virtual machine 32 through the registration interface 331. The virtual machine 32 performs a compilation according to the above mapping relation, so that an execution code corresponding to the target code is acquired. In addition, the virtual machine may also send a call instruction to an invoker 35, so that the invoker 35 invokes a created wrapper object 341 in the wrapper module 34 through an invocation interface 343, to execute a native code corresponding to the wrapper object in the operating system 36.

In an embodiment of the present application, the content and format of a registration instruction and of a creation instruction may be the same or different. That is, a registry component may modify the content and format of a received registration instruction, and send it to a wrapper module, or it may directly forward the registration instruction as a creation instruction to the wrapper module without any modification.

In an embodiment of the present application, a native code is directly wrapped. Through a registration mechanism, a registration and an invocation are opened to the outside. As the registration is a dynamic process, it is easy to match and upgrade a native code. The above operating system may include, but is not limited to, an Android system, an iOS system, or other Linux-based systems.

Figure 6:
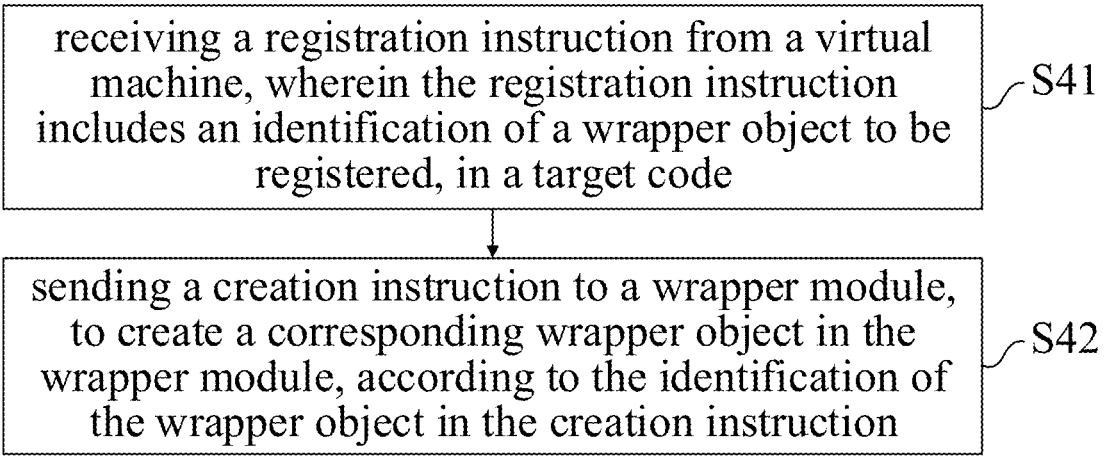
FIG. 6 is a schematic flowchart showing a registration method according to an embodiment of the present application.

FIG. 6 is a schematic flowchart showing a registration method according to an embodiment of the present application. As shown in FIG. 6, the registration method is applied to a registry component. The registration method includes:

S41, receiving a registration instruction from a virtual machine, wherein the registration instruction includes an identification of a wrapper object to be registered, in a target code; and S42, sending a creation instruction to a wrapper module, to create a corresponding wrapper object in the wrapper module according to the identification of the wrapper object in the creation instruction.

In an implementation, the registry component includes a registration interface. S61 includes: receiving the registration instruction from the virtual machine through a registration interface of the registry component. S62 includes: sending the creation instruction to the wrapper module through a creation interface of the wrapper module.

Figure 7:
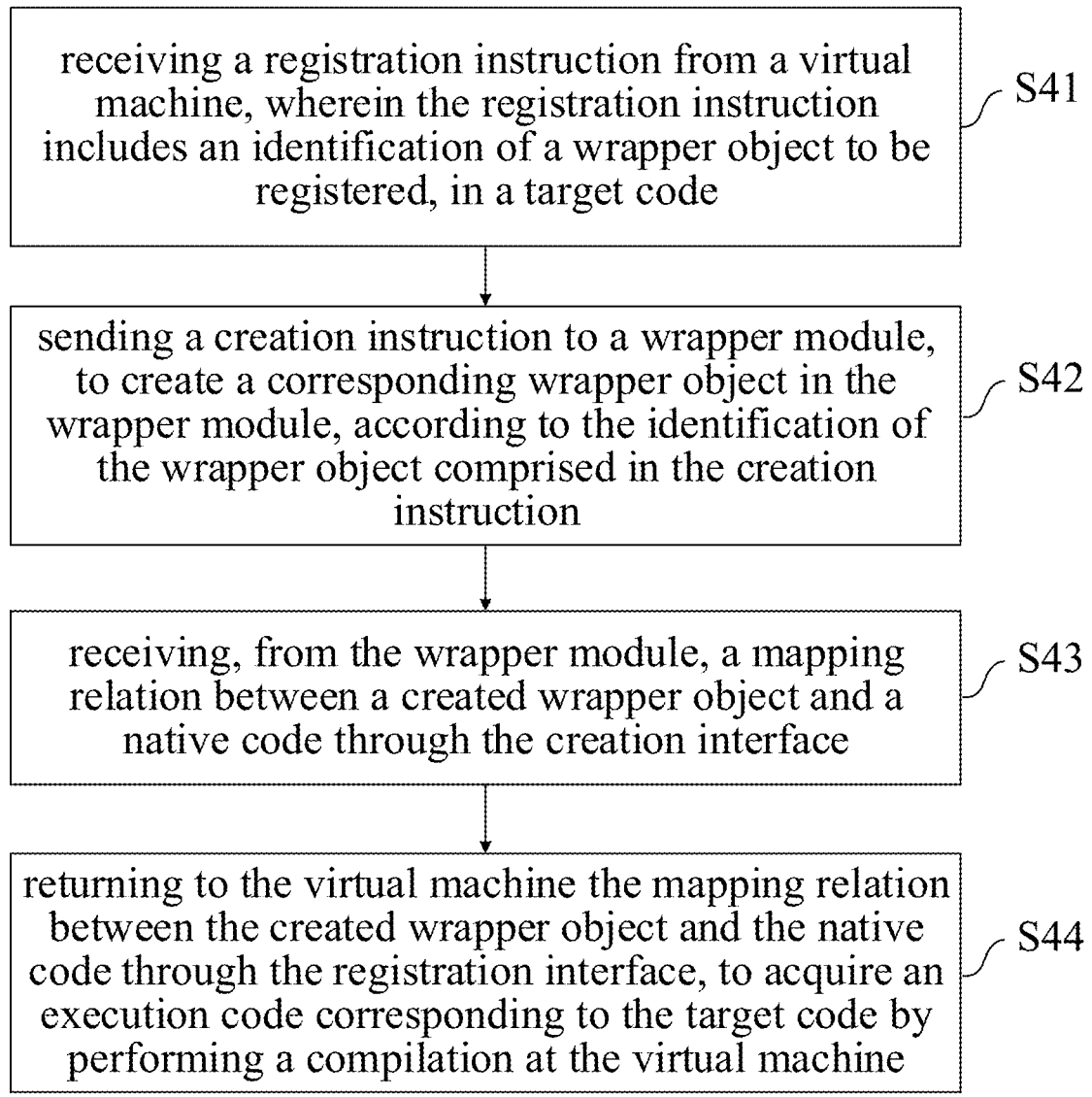
FIG. 7 is a schematic flowchart showing a registration method according to an embodiment of the present application.

In an implementation, as shown in FIG. 7, the wrapper module includes a creating interface, and the registration method further includes:

S43, receiving, from the wrapper module, a mapping relation between a created wrapper object and a native code through the creation interface; and S44, returning to the virtual machine the mapping relation between the created wrapper object and the native code through the registration interface, to acquire an execution code corresponding to the target code by performing a compilation at the virtual machine.

The embodiment has the same meaning as the description of the above-mentioned wrapping method embodiments, such as, the working process of a registry component, or of a wrapper module. Reference may be made to related description of the foregoing embodiments.

Figure 8:
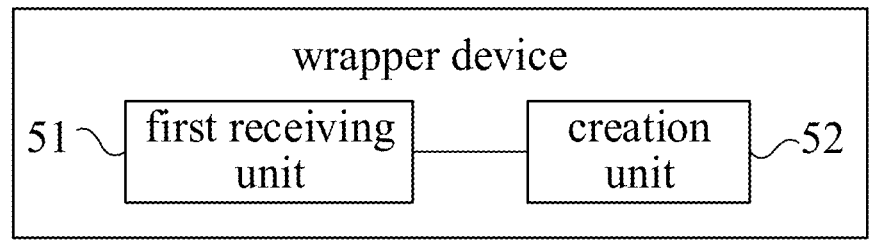
FIG. 8 is a structural block diagram showing a wrapper device according to an embodiment of the present application.

FIG. 8 is a structural block diagram showing a wrapper device according to an embodiment of the present application. As shown in FIG. 8, the wrapper device may be applied to a wrapper module, and the wrapper device may include:

a first receiving unit 51, configured to receive a creation instruction from a registry component, wherein the creation instruction includes an identification of a wrapper object to be registered, in a target code; and a creation unit 52, configured to create a corresponding wrapper object in the wrapper module, according to the identification of the wrapper object to be registered in the target code.

In an implementation, the wrapper module includes a creation interface, and the first receiving unit 51 is further configured to receive a creation instruction from a registry component through the creation interface.

Figure 9:
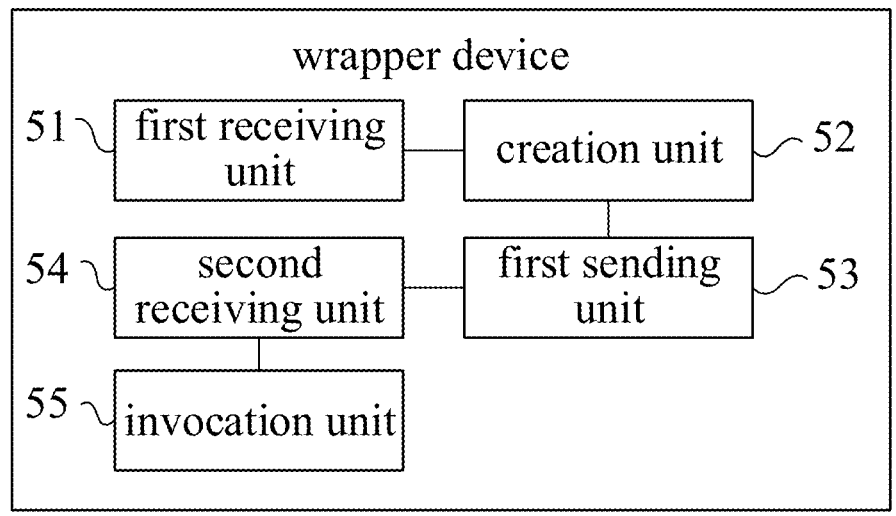
FIG. 9 is a structural block diagram showing a wrapper device according to an embodiment of the present application.

As shown in FIG. 9, the device further includes: a first sending unit 53, configured to send a mapping relation between a created wrapper object and a native code to the registry component through the creation interface.

In an implementation, the wrapper module further includes an invocation interface, and the device further includes:

a second receiving unit 54, configured to receive a call instruction from an invoking component through the invocation interface, wherein the call instruction includes an identification, a method name, and a parameter of a wrapper object to be executed; and an invocation unit 55, configured to invoke, after finding out, from the wrapper module, a wrapper object corresponding to the identification of the wrapper object to be executed, a method corresponding to the method name of the wrapper object to be executed, and to load the parameter of the wrapper object to be executed, to execute a native code corresponding to the wrapper object to be executed, in an operating system.

In an implementation, the wrapper module further includes a feedback interface, and the device further includes:

a second sending unit 56, configured to send feedback information to a virtual machine through the feedback interface, wherein the feedback information includes an execution result acquired by the wrapper module from the operating system.

In an implementation, the device further includes:

a pre-wrapping unit 57, configured to wrap a native code in an operating system in advance, to acquire a wrapper object, and an identification and a method name corresponding to the acquired wrapper object.

In the embodiment, for functions of units in the wrapper device, reference may be made to corresponding descriptions of the above wrapping method applied to a wrapper module, and thus a detailed description thereof is omitted herein.

FIG. 10 is a structural block diagram showing a registration device according to an embodiment of the present application. As shown in FIG. 10, the registration device may be applied to a registry component, and the device includes:

a third receiving unit 61, configured to receive a registration instruction from a virtual machine, wherein the registration instruction includes an identification of a wrapper object to be registered, in a target code; and a third sending unit 62, configured to send a creation instruction to a wrapper module, to create a corresponding wrapper object in the wrapper module according to the identification of the wrapper object in the creation instruction.

In an implementation, the third receiving unit 61 is further configured to receive the registration instruction from the virtual machine through a registration interface of the registry component; and the third sending unit 62 is configured to send the creation instruction to the wrapper module through a creation interface of the wrapper module.

Figure 11:
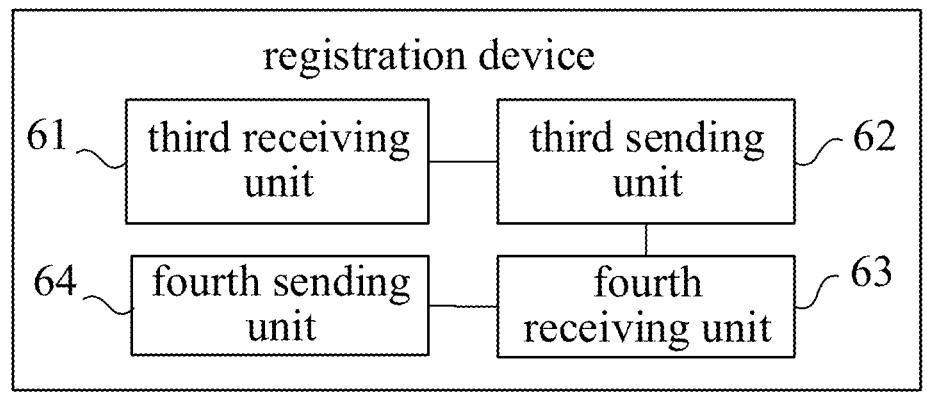
FIG. 11 is a structural block diagram showing a registration device according to an embodiment of the present application.

In an embodiment, as shown in FIG. 11, the device further includes:

a fourth receiving unit 63, configured to receive, from the wrapper module, a mapping relation between a created wrapper object and a native code through the creation interface; and a fourth sending unit 64, configured to return to the virtual machine the mapping relation between the created wrapper object and the native code through the registration interface, to acquire an execution code corresponding to the target code by performing a compilation at the virtual machine.

In the embodiment, for functions of units in the registration device, reference may be made to corresponding descriptions of the above registration method applied to a registration component, and thus a detailed description thereof is omitted herein.

Figure 12:
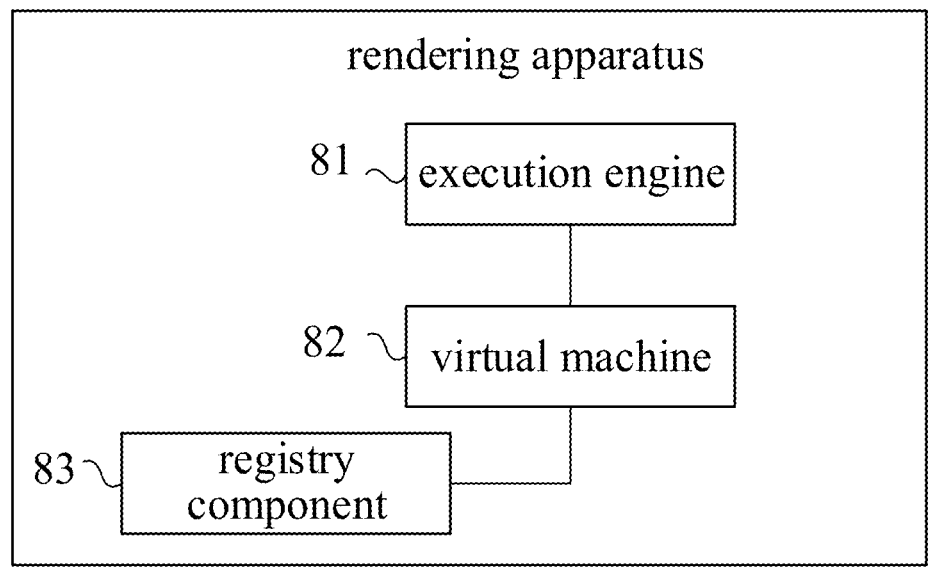
FIG. 12 is a structural block diagram showing a rendering apparatus according to an embodiment of the present application.

FIG. 12 is a structural block diagram showing a rendering apparatus according to an embodiment of the present application. As shown in FIG. 12, the rendering apparatus may include:

an execution engine 81, configured to send an initialization instruction to a virtual machine, wherein the initialization instruction is acquired by loading a target code through the execution engine, and to receive an execution code corresponding to the target code from the virtual machine;

a virtual machine 82, configured to receive the initialization instruction from the execution engine, wherein the initialization instruction is acquired by loading the target code through the execution engine; to send a registration instruction to a registry component according to the initialization instruction, wherein the registration instruction includes an identification of a wrapper object to be registered, in the target code; to acquire the execution code corresponding to the target code by a compilation, according to a mapping relation between a wrapper object and a native code of an operating system; and to send the execution code to the execution engine for execution; and a registry component 83, configured to execute the registration method applied to a registry component in above embodiments. Specifically, the registry component may receive a registration instruction from a virtual machine, to create a wrapper object required to execute a target code. The registry component may include a registration interface 331 as shown in FIG. 5. The registry component may interact with a virtual machine through the registration interface.

In an implementation, the execution engine is further configured to send an execution instruction to the virtual machine, wherein the execution instruction is acquired by executing the above execution code through the execution engine.

Figure 13:
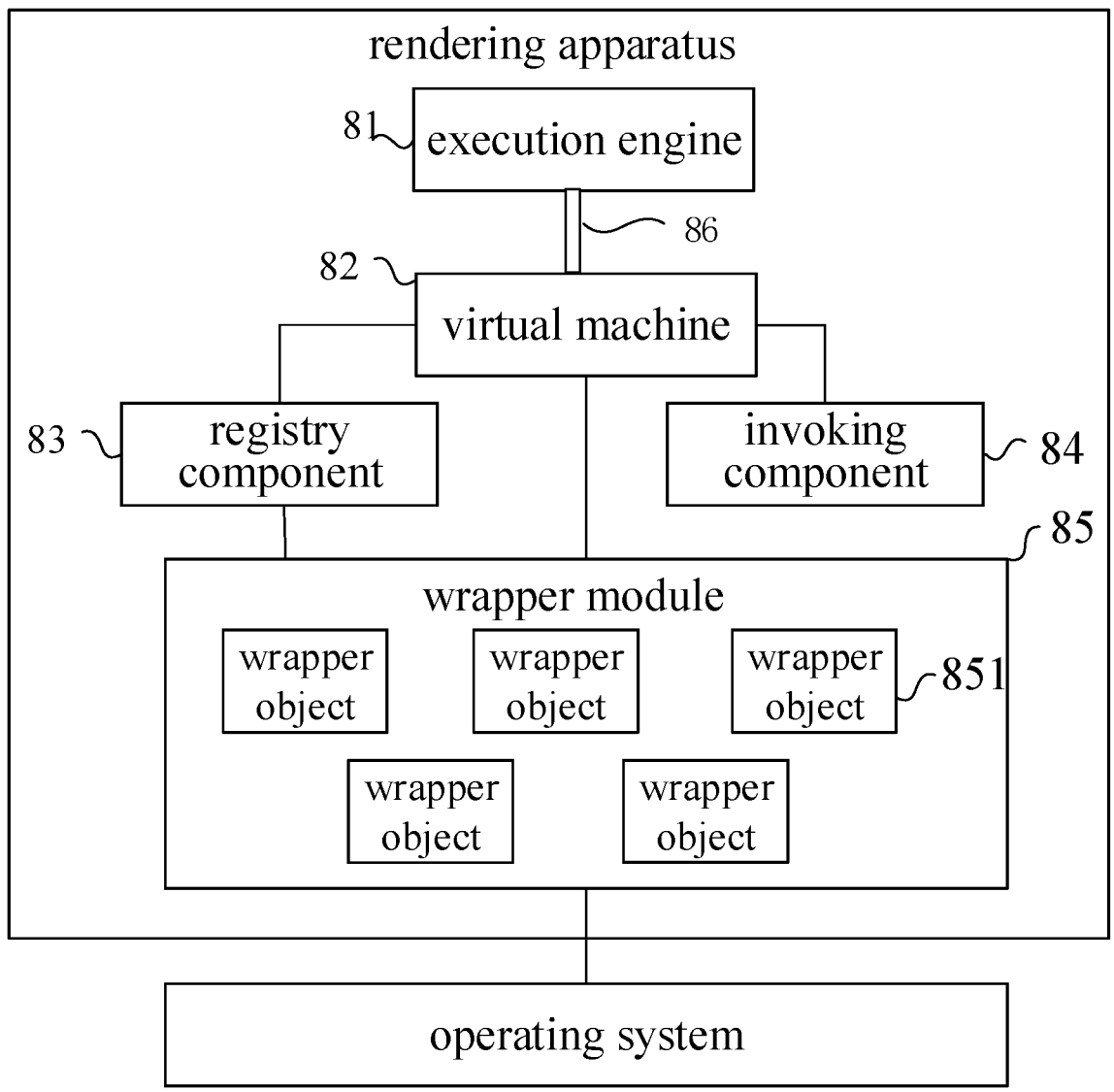
FIG. 13 is a structural block diagram showing a rendering apparatus according to an embodiment of the present application.

In an implementation, as shown in FIG. 13, the rendering apparatus further includes:

an invoking component 84, configured to receive a call instruction from the virtual machine, to invoke a wrapper object in a wrapper module; and the wrapper module 85, including at least one wrapper object 851 required to execute a target code. The wrapper module is configured to execute the wrapping method applied to a wrapper module in foregoing embodiments. Specifically, the wrapper module may receive a registration instruction from a registration component, complete a registration of a wrapper object, and acquire a mapping relation between the wrapper object and a native code. The wrapper module may also receive a call instruction from an invocation module and invoke a created wrapper object, to execute a native code corresponding to the wrapper object to be executed in an operating system. The wrapper module may include a creation interface 342, an invocation interface 343, and a feedback interface 344 as shown in FIG. 5. The wrapper module may interact with a registry component through a creation interface, may interact with an invocation component through an invocation interface, and may feed various messages back to a virtual machine through a feedback interface.

In an implementation, the rendering apparatus further includes: a bridge 86, configured to send the initialization instruction from the execution engine to the virtual machine, and to send the execution code from the virtual machine to the execution engine. The bridge 86 may further send the execution instruction from the execution engine to the virtual machine and receive an execution result returned by the virtual machine. The execution engine and the virtual machine exchange message through the bridge, so that a message transmission between a target code and a native code may be realized. Capabilities of an operating system are fully utilized, which is beneficial for improving code execution efficiency while ensuring security.

In an application example, referring to FIG. 3, a rendering apparatus may include an execution engine 31, a virtual machine 32, a wrapper registry component (wrapper registry) 33, an invoker 35, a bridge 37, and the like. Taking the execution engine as a V8 engine and the virtual machine as an Atom VM as an example, the process of executing a target code by the rendering apparatus is described. In this example, the V8 engine is mainly used for a code execution function, and a code compilation is performed by the virtual machine.

A target code is loaded in the execution engine 31, to generate an initialization instruction. The virtual machine 32 may manage a wrapper object, to realize a mapping of the target code to the wrapper object in the apparatus. In addition, the virtual machine 32 may further manage an operating environment of the execution engine and the target code, such as executing an initialization of the v8 engine, executing an initialization of a framework, and the like. The virtual machine performs information interaction with the target code through a bridge, where the bridge 37 is the only message path between the target code and a native code.

After loading the target code and determining methods of the wrapper objects (wrappers) at a terminal that are required to be invoked, the execution engine 31 may send the initialization instruction to the virtual machine 32 through the bridge 37. Each of these instructions may include an object identification (id), a method name, and a parameter. For example, an object ID is "image", the method name is "setImage", and the parameters are {a, b, c}.

The virtual machine 32 may find out the corresponding wrapper object 341 according to the object identification. Through the invoker 35, an invocation from the method name of the wrapper object 341 to the corresponding native code is implemented, thereby realizing an invocation of a corresponding method according to a method name.

After a method is invoked, an execution result may be invoked back to the target code. The wrapper object 341 may also cause various events at a terminal. In both cases, a message may be transmitted to the target code through a unified path (bridge) of the VM.

In an embodiment of the present application, a wrapper mapping between an execution engine and a native code is integrated through a virtual machine mechanism, which not only ensures target code execution efficiency, but also ensures system security.

Figure 14:
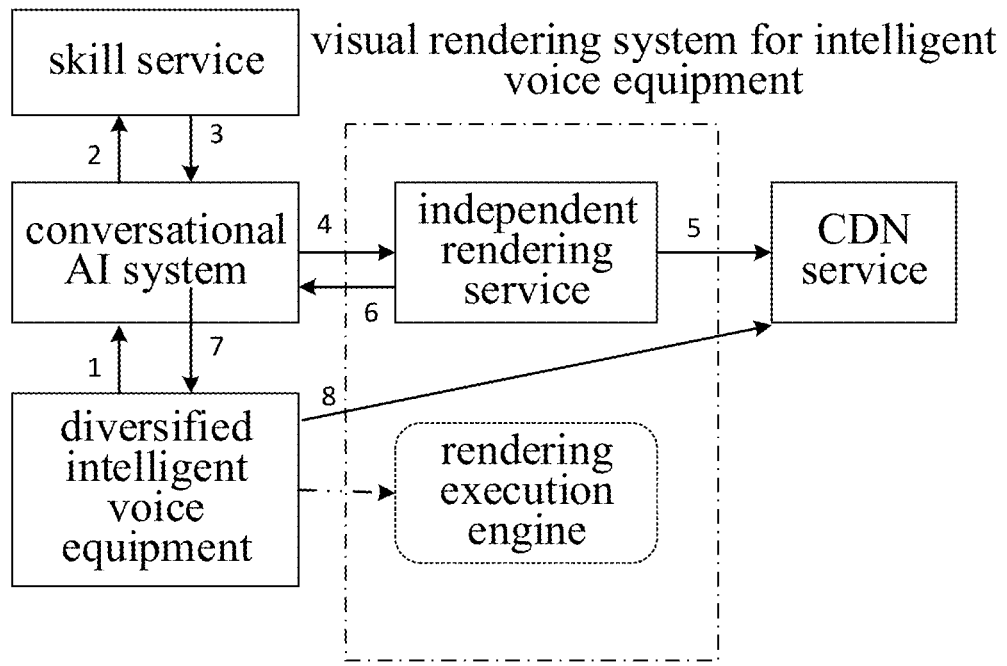
FIG. 14 is a schematic diagram showing an application scenario of a rendering apparatus according to an embodiment of the present application.

As shown in FIG. 14, it is a schematic diagram showing a rendering system according to an embodiment of the present application. The rendering system may be a visual rendering system for an intelligent voice apparatus. The rendering system may include a skill service, a conversational AI system, an independent rendering service, a CDN service, a smart voice apparatus, and the like.

An overall operation flow is as follows:

1) A user inquires an intelligent voice apparatus through voice, and the intelligent voice apparatus transmits the user's inquiry to a conversational AI system. The intelligent voice apparatus is the apparatus in foregoing embodiments. The apparatus may have a screen.

2) After performing an Automatic Speech Recognition (ASR) and a Natural Language Understanding (NLU), the conversational AI system transmits an intention to a skill service. The skill service may be a server that provides content to be rendered.

3) The skill service returns the content to be rendered to the conversational AI system, where the content to be rendered may include content and resources.

4) The conversational AI system transmits the content to be rendered, information of the intelligent voice apparatus, and information of the skill service to an independent rendering server.

5) The independent rendering server transmits static data in the content to be rendered to a Content Delivery Network (CDN) service.

6) The independent rendering service selects a rendering template suitable for the intelligent voice apparatus based on the content received in step 4), and render the content to be rendered by using the selected rendering template, to generate a target code that is conveniently executed by the intelligent voice apparatus, and to return the target code to the conversational AI system.

7) The conversational AI system returns data, such as the received target code and related context information, to the intelligent voice apparatus.

8) A rendering execution engine in the intelligent voice apparatus executes the above target code and displays it on a screen. The intelligent voice apparatus may pull the static resources in the content to be rendered directly from the CDN.

With respect to the structure of the rendering execution engine, reference man by made to the rendering apparatus in foregoing embodiments. For example, referring to FIG. 3, the rendering execution engine includes an execution engine 31, a virtual machine 32, a wrapper registry component 33, an invoker 35, a bridge 37, and the like. A target code is loaded in the execution engine 31, and an identification, a method name, and a parameter of a wrapper object required to execute the target code are sent to the virtual machine 32 through the bridge. The virtual machine 32 creates respective wrapper objects in the wrapper module 34 through the wrapper registry component 33. After the creation is completed, the virtual machine 32 may invoke the wrapper object 341 through the invoker 35, to implement an invocation from the method name of the wrapper object 341 to the corresponding native code, thereby realizing an invocation of a corresponding method according to a method name. After the method is invoked, an execution result may be invoked back to the target code. The wrapper object 341 may also cause various events at a terminal. After the wrapper module feeds back these messages to the virtual machine, the virtual machine transmits these messages to the execution engine through the bridge.

With respect to the specific working principle of the rendering execution engine, reference may be made to the wrapping method, the wrapper device, and the rendering apparatus in foregoing embodiments, and the related descriptions of FIG. 3, FIG. 5, and FIG. 14.

According to an embodiment of the present application, an electronic apparatus and a readable storage medium are further provided in the present application.

Figure 15:
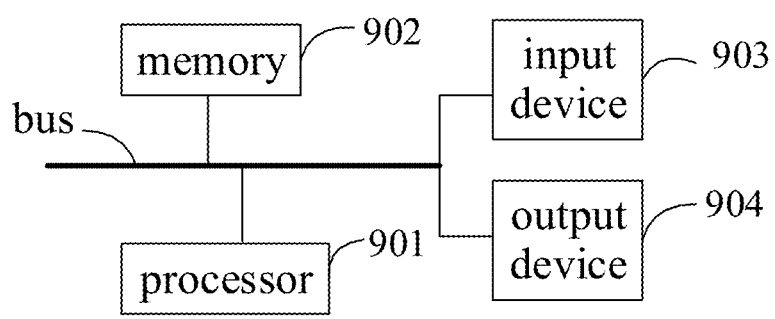
FIG. 15 is a block diagram showing an electronic apparatus for implementing an embodiment of the present application.

As shown in FIG. 15, it is a block diagram showing an electronic apparatus according to an embodiment of the present application. The electronic apparatus is intended to represent various forms of digital computers, such as laptop computers, desktop computers, workbenches, personal digital assistants, servers, blade servers, mainframe computers, and other suitable computers. The electronic apparatus may also represent various forms of mobile devices, such as personal digital processors, cellular phones, intelligent phones, wearable devices, and other similar computing devices. Components shown in the present application, their connections and relations, and their functions are merely examples, and are not intended to limit the implementation of the application described and/or required herein.

As shown in FIG. 15, the electronic apparatus includes: one or more processors 901, a memory 902, and interfaces for connecting various components, including a high-speed interface and a low-speed interface. The various components are interconnected using different buses and may be mounted on a common motherboard or otherwise installed as required. The processor may process instructions executed within the electronic apparatus, including instructions for storing in or on a memory, to display graphical information of a graphical user interface (GUI) on an external input/output device (such as a display device coupled to the interface). In other implementations, multiple processors and/or multiple buses may be used with multiple memories, if desired. Similarly, multiple electronic apparatuses may be connected, each apparatus providing some of the necessary operations (for example, as a server array, a group of blade servers, or a multiprocessor system). In FIG. 15A, one processor 901 is shown as an example.

The memory 902 is a non-transitory computer-readable storage medium provided by the present application. The memory stores instructions executable by at least one processor, so that the at least one processor executes the wrapping method and the registration method provided in the present application. The non-transitory computer-readable storage medium of the present application stores computer instructions, which are configured to enable a computer to execute the wrapping method and the registration method provided by the present application.

As a non-transitory computer-readable storage medium, the memory 902 may be used to store non-transitory software programs, non-transitory computer executable programs, and modules, such as program instructions/modules corresponding to the wrapping method or the registration method in embodiments of the present application. Module/unit (for example, the first receiving unit 51, the creation unit 52 shown in FIG. 8, or the third receiving unit 61, the third sending unit 62 shown in FIG. 10). The processor 901 executes various functional applications and data processing of the server by running non-transitory software programs, instructions, and modules stored in the memory 902, that is, to implement the wrapping method or the registration method in foregoing method embodiments.

The memory 902 may include a storage program area and a storage data area, where the storage program area may store an application program required by an operating system or for at least one function; the storage data area may store data created according to the use of an electronic device applied with the wrapping method or the registration method, and the like. In addition, the memory 902 may include a high-speed random-access memory, and may also include a non-transitory memory, such as at least one magnetic disk storage device, a flash memory device, or other non-transitory solid-state storage device. In some embodiments, the memory 902 may optionally include a memory remotely set relative to the processor 901, and these remote memories may be connected to the electronic apparatus through a network. Examples of the above network include, but are not limited to, an Internet, an intranet, a local area network, a mobile communication network, and combinations thereof.

The electronic apparatus may further include an input device 903 and an output device 904. The processor 901, the memory 902, the input device 903, and the output device 904 may be connected through a bus or in other manners. In FIG. 15, a connection through a bus is shown as an example.

The input device 903 may receive input numeric or character information, and generate key signal inputs related to a user setting and a function control of an electronic apparatus, such as a touch screen, a keypad, a mouse, a trackpad, a touchpad, a pointing stick, one or more mouse buttons, a trackball, a joystick and other input devices. The output device 904 may include a display device, an auxiliary lighting device (for example, an LED), a haptic feedback device (for example, a vibration motor), and the like. The display device may include, but is not limited to, a Liquid Crystal Display (LCD), a Light Emitting Diode (LED) display, and a plasma display. In some implementations, the display device may be a touch screen.

Various implementations of the systems and technologies described herein may be implemented in a digital electronic circuit system, an integrated circuit system, an application specific integrated circuit (ASIC), a computer hardware, a firmware, a software, and/or combinations thereof. These various implementations may include: implementations in one or more computer programs, where the one or more computer programs are executable and/or interpretable on a programmable system including at least one programmable processor, programmable processor, where the programmable processor may be a dedicated or general-purpose programmable processor that may receive data and instructions from a storage system, at least one input device, and at least one output device, and may transmit the data and instructions to the storage system, the at least one input device, and the at least one output device.

These computing programs (also known as programs, software, software applications, or codes) include machine instructions of a programmable processor and may be implemented by using a high-level procedural and/or object-oriented programming language, and/or an assembly/machine language. As used herein, the terms "machine-readable medium" and "computer-readable medium" refer to any computer program product, apparatus, and/or device used to provide machine instructions and/or data to a programmable processor (for example, a magnetic disk, an optical disk, a memory, and a programmable logic device (PLD)), including machine-readable media that receives machine instructions as machine-readable signals. The term "machine-readable signal" refers to any signal used to provide machine instructions and/or data to a programmable processor.

In order to provide an interaction with a user, the systems and techniques described herein may be implemented on a computer, where the computer includes: a display device (for example, a Cathode Ray Tube (CRT) or liquid crystal display (LCD) monitor) for displaying information to the user; and a keyboard and pointing device (such as a mouse or a trackball) through which the user may provide input to a computer. Other kinds of devices may also be used to provide interaction with a user; for example, a feedback provided to a user may be a sensory feedback in any form (for example, a visual feedback, an auditory feedback, or a haptic feedback); and a user input (including an acoustic input, a voice input, or a tactile input) may be received in any form.

The systems and technologies described herein may be implemented in a computing system including a background component (for example, as a data server), a computing system including a middleware component (for example, an application server), or a computing system including a front-end component (for example, a user computer with a graphical user interface or a web browser, through which the user may interact with an implementation of the systems and technologies described herein), or a computer system including any combination of such a background component, a middleware component, or a front-end component. The components of the system may be interconnected by any form or medium of digital data communication (such as, a communication network). Examples of a communication network include a Local Area Network (LAN), a Wide Area Network (WAN), and the Internet.

A computer system may include a client and a server. The client and the server are generally remote from each other and typically interact with each other through a communication network. A client-server relation is generated by computer programs running on respective computers and having a client-server relation with each other.

According to the technical solution of embodiments of the present application, a virtual machine may control a registry component to create a wrapper object, and a compilation of a target code may be transferred to the virtual machine. Thus, an execution engine may mainly control a code execution process, thereby improving code execution efficiency.

It should be understood the steps in the various processes described above may be reordered or omitted, or other steps may be added therein. For example, the steps described in the application may be performed parallelly, sequentially, or in different orders, as long as the desired results of the technical solutions disclosed in the application may be achieved, to which no limitation is made herein.

The embodiments above do not constitute a limitation on the protection scope of the present application. It should be understood by those skilled in the art that various modifications, combinations, sub-combinations, and substitutions may be available according to design requirements and other factors. Any modifications, equivalent replacements and improvements made within the spirit and principle of the present application shall be covered within the protection scope of the present application.

What is claimed is:
1. A rendering apparatus, comprising:
an execution engine, configured to send an initialization instruction for initializing a wrapper object to a virtual machine, wherein the initialization instruction is acquired by loading a target code through the execution engine, and to receive an execution code corresponding to the target code from the virtual machine;

the virtual machine, configured to receive the initialization instruction from the execution engine; to send a registration instruction through a registration interface for registering the wrapper object to a registry component according to the initialization instruction, wherein the registration instruction comprises an identification of the wrapper object to be registered, in the target code; to acquire the execution code corresponding to the target code by a compilation, according to a mapping relation between a wrapper object and a native code of an operating system; and to send the execution code to the execution engine for execution; and the registry component, configured to receive the registration instruction from the virtual machine through the registration interface; and send a creation instruction to a wrapper module through a creation interface, to create a corresponding wrapper object in the wrapper module according to the identification of the wrapper object in the creation instruction.

2. The rendering apparatus according to claim 1, wherein the execution engine is further configured to send an execution instruction to the virtual machine, such that the virtual machine generates a call instruction according to the execution instruction, wherein the execution instruction is acquired by executing the execution code through the execution engine; and the rendering apparatus further comprises:

an invoking component, configured to receive the call instruction from the virtual machine, to invoke a wrapper object in the wrapper module; and the wrapper module, configured to, before receiving the call instruction from the virtual machine and before invoking the wrapper object in the wrapper module through an invocation interface, receive the creation instruction from the registry component through the creation interface, wherein the creation instruction comprises the identification of the wrapper object to be registered, in the target code; and create the corresponding wrapper object in the wrapper module, according to the identification of the wrapper object to be registered in the target code.

3. The rendering apparatus according to claim 1, further comprising: a bridge, configured to send the initialization instruction from the execution engine to the virtual machine, and to send the execution code from the virtual machine to the execution engine.

4. The rendering apparatus according to claim 2, further comprising: a bridge, configured to send the initialization instruction from the execution engine to the virtual machine, and to send the execution code from the virtual machine to the execution engine.

* * * * *